United States Patent [19]

Patel

[11] Patent Number: 4,545,055
[45] Date of Patent: Oct. 1, 1985

[54] ERROR ANALYZER FOR DATA COMMUNICATED BY BUS PROTOCOL

[75] Inventor: Jayantilal Patel, San Diego, Calif.

[73] Assignee: Loral Corporation, New York, N.Y.

[21] Appl. No.: 516,113

[22] Filed: Jul. 20, 1983

[51] Int. Cl.$^4$ .......................... H04L 1/20; G06F 11/00
[52] U.S. Cl. ........................................ 371/55; 371/57; 375/55
[58] Field of Search .................... 371/55, 56, 57, 62; 375/55

[56] References Cited

U.S. PATENT DOCUMENTS

| | | | |
|---|---|---|---|
| 3,156,893 | 11/1964 | Harel | 371/55 |
| 3,938,082 | 2/1976 | Schowe, Jr. | 371/56 |
| 4,086,566 | 4/1978 | Lender | 371/56 |
| 4,276,649 | 6/1981 | Groenendaal et al. | 371/55 |
| 4,475,212 | 10/1984 | McLean et al. | 375/17 |

OTHER PUBLICATIONS

L. Sanders for Data–Comm. Links, Manchester Chip Could Be Best, Electronic Design, vol. 30, No. 6, Aug. 5, 1982, pp. 201–212.

Primary Examiner—Charles E. Atkinson
Attorney, Agent, or Firm—Spensley Horn, Jubas & Lubitz

[57] ABSTRACT

In this system for detecting errors in data handled on a bus in a biphase format in accordance with a certain bus protocol, a pair of signals are established. The digitally measured time durations of these signals accurately represent the respective positive and negative excursion times of the bus data. Certain analyzers detect errors digitally in response to these measured time durations. Each analyzer means includes a half sync detection means for ascertaining that the time duration of each of these signals corresponds to the expected time duration of half of an initial sync signal transmitted in conformance with the bus protocol. A valid sync detector ascertains the consecutive occurrence of valid half sync signals from each analyzer, and provides a valid sync detected signal, and indicates sync type. Additional circuitry determines if following data bit transitions occur with the correct timings, and count the number of data bit timings which occur before detection of the next sync signal or detection of a line inactive condition. Various errors are detected in accordance with these measurements.

10 Claims, 9 Drawing Figures

FIG. 1
Data Encoding

FIG. 2
Word Formats

ERROR ANALYZER FOR DATA COMMUNICATED BY BUS PROTOCOL

BACKGROUND OF THE INVENTION

1. Field of the Invention

The present invention relates to a system for detecting certain classes of errors in data communicated on a data bus in accordance with a certain protocol defining signal configuration and word format.

2. Description of the Prior Art

In many digital data networks, information is communicated between subsystems or terminals via a data bus that is time shared. An example of such a time division multiplexed data bus architecture is that utilized for the intercommunication of information between the electronics subsystems in a military aircraft.

To ensure proper communication of data on such a bus, a certain bus protocol is established. This defines the signal shape and data word format of all information that is to be transmitted via the bus. In the case of military aircraft electronics systems the data bus protocol is established by a certain military standard MIL-STD-15553A and B. While certain reference will be made herein to the data encoding and word format configuration used by this standard, the invention is not so limited, but can be used in connection with other bus protocols and other data bus applications, such as computer networks with their associated protocols.

Figure 1:
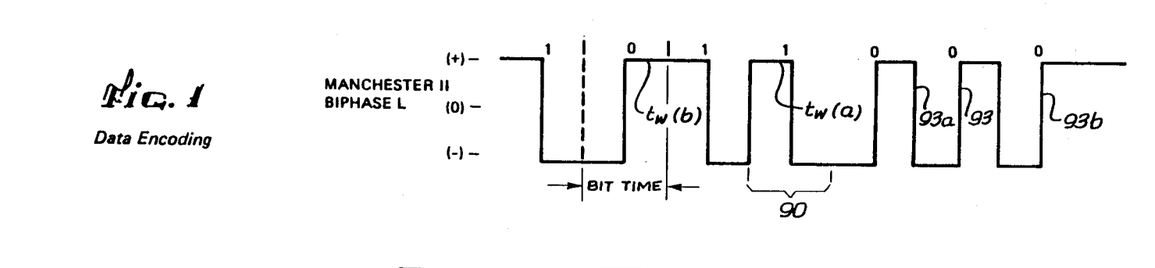
FIG. 1 shows a typical data encoding scheme illustrating the idealized waveform of data transmitted on the bus which is monitored by the present invention.
Figure 2:
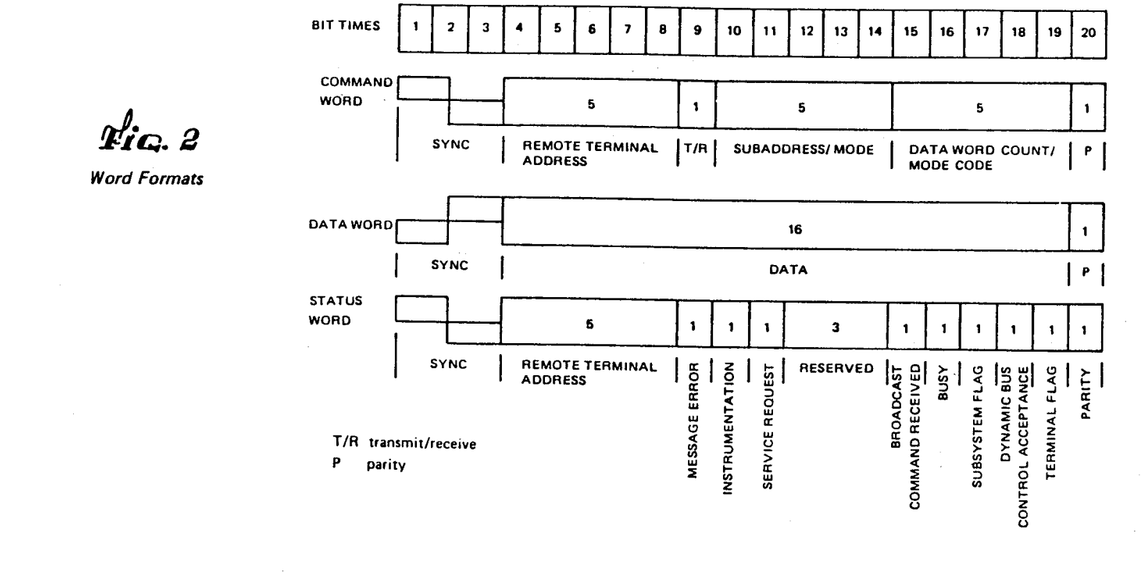
FIG. 2 illustrates typical word formats as utilized in the protocol of MIL-STD-1553.

FIGS. 1 and 2 illustrate the signal configuration (i.e., data encoding) and word format respectively for the protocol used in MIL-STD-1553, and is exemplary of other data bus protocols. The data signal is transmitted on the bus in Manchester II biphase L coding, in which the data signal alternates between positive (+) and negative (−) voltage level. In each bit time there is a mid-bit transition in voltage level from postive to negative (which represents a binary "1") or from negative to positive (which represents a binary "0"). The bit time duration is fixed. In MIL-STD-1553 the transition bit rate is 1.0 megabit per second, so that each bit time is one microsecond in duration.

Data is transmitted in the form of a word having twenty bit times (FIG. 2). The first three bit times are used to transmit a sync signal. This differs from the data bit signal in that the sync time duration is equal to three bit times, with a voltage transition occurring only at the center of the second bit time. There are two sync configurations, which are used to distinguish data words from command or status words. For a data word, the transmitted signal is of negative polarity for the first one and one-half bit times, has a negative to positive transition at the center of the second time, and thereafter is positive for one and one-half bit times. For a command or status word, the sync pulse is positive for the first one and one-half bit times, has a positive to negative transition at the center of the second bit time, and thereafter is negative for one and one-half bit times.

During the next bit times 4 through 19, sixteen data bits can be transmitted, each having the data encoding characteristic shown in FIG. 1. For a data word, the bits can have arbitrary significance. For a command or status word, the bits designate certain specified information such as remote terminal address, data word count etc., (as shown in FIG. 2). During the final (20th) bit time, a parity bit is transmitted. Blocks of up to thirty-three such words (typically including the command word), one immediately following another, may be sent on the bus. The presence of the sync pulse designates the beginning of the following word.

Various errors can occur in the transmission of data on the bus. For example, degradation of the signal waveshape may occur so that the transitions between positive and negative levels become distorted and well-defined, easily detected transitions do not properly occur at the mid-bit time. Circuitry malfunction may cause transmission of too many or too few bits per word. In another error mode, no transition at all may occur during a certain bit time, so that it cannot be determined whether the transmission of a binary "1" or "0" was intended.

An object of the present invention is to provide a system for detecting and analyzing certain classes of errors which might occur on a bus handling data in accordance with a certain bus protocol. A further objective is to provide such a system for analyzing data encoded in a biphase format. The system is capable of determining the presence of a biphase transition, and of determining whether such transition is of sufficient sharpness (i.e., not distorted beyond acceptable recognition) and occurs within acceptable time tolerances with respect to the actual center of the bit time.

Another object of the present invention is to provide an error detecting system which continuously looks for the presence of a sync signal, even during those times when data bit transmission is expected. This capability enables the system to determine a class of error which might occur if a word is transmitted having too few bits, immediately followed by another word or by the bus going inactive or "dead". In such instance, the beginning of the subsequent word would immediately be sensed by the detected presence of the sync signal. The presence of too few bits during the preceding word concomitantly would be determined, so that that word can be flagged as an error.

SUMMARY OF THE INVENTION

These and other objects are achieved by providing an error analyzer which separately monitors the positive and negative portions of the data signal transmitted on the bus. A "positive analyzer" operates in conjunction with a threshold detector which produces a true output only when the biphase signal exceeds a certain threshold level. The resultant output thus comprises a rectangular wave signal having a time duration corresponding to that time during which the positive portion of the biphase signal exceeded a positive threshold level. A separate like "negative analyzer" produces a true output when the transmitted biphase signal exceeds a certain threshold in the negative polarity direction. Thus this negative analyzer output likewise comprises a rectangular wave that is true for the duration that the transmitted data signal exceeds a certain negative threshold level.

For valid sync detection, the output rectangular waveforms from the positive and negative analyzer circuits must occur consecutively (with no overlap), and each must be within certain time width tolerance values. Only when these conditions are met is it determined that a valid sync is present.

The same positive and negative analyzers are used to determine the presence of valid data bits. Once again, consecutive outputs from both analyzers are required, within acceptable time tolerances.

Within each positive and negative analyzer, a time measurement of the respective positive or negative excursion of the data signal is made. Thereafter, a determination is made as to whether this measured time falls within the acceptable ranges for either a sync signal or a valid data bit. As these time comparisons are made at each data signal transition, a determination can continuously be made as to whether a valid sync signal is present, irrespective of whether the correct number of data bits has been received for the preceding word. In this manner, the system continuously looks for the presence of a sync signal. By keeping count of the number of valid data bits between consecutive sync signals (or between a sync signal and the bus going inactive), a determination can be made as to whether the prior word was of correct length, or whether it had too many or too few bits.

By monitoring the lengths of the positive and negative excursions of the data signal, the system also can determine whether a valid data bit is present, as characterized by a polarity transition at the center of the bit time, or whether an invalid signal has been received (e.g., one in which there is no transition at the center of a particular bit time).

BRIEF DESCRIPTION OF THE DRAWINGS

A detailed description of the invention will be made with reference to the accompanying drawings wherein like numerals designate corresponding parts in the several figures.

DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention since the scope of the invention best is defined by the appended claims.

Figure 5:
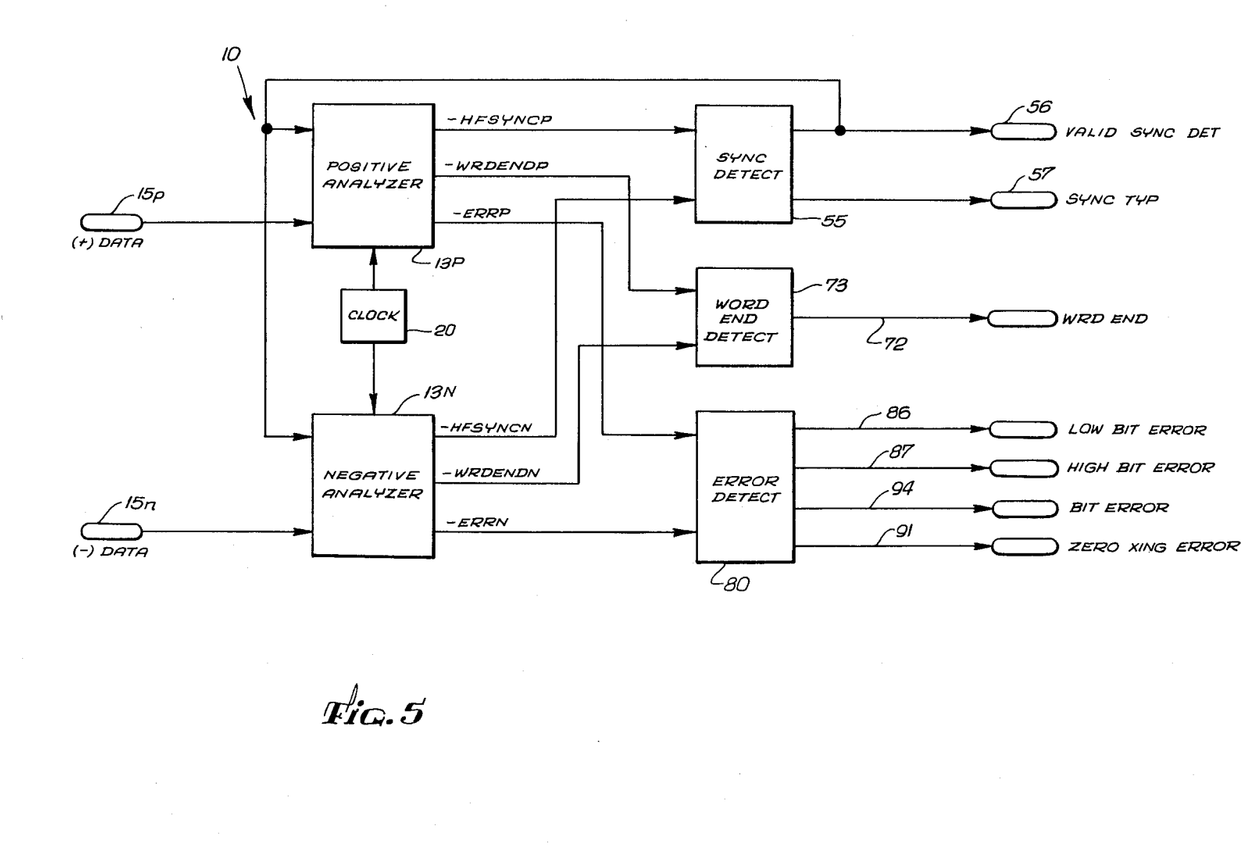
FIG. 5 is a block diagram of the error analyzer system in accordance with the present invention, and which utilizes the excursion width detectors of FIG. 4.

The inventive error analyzer 10 (FIG. 5) is used to monitor a biphase data signal 11 (FIG. 3) which utilizes the Manchester data encoding scheme of FIG. 1 for transmitting information in accordance with the word format of FIG. 2. The data signal 11 alternates between positive and negative polarity. The beginning of a command word is illustrated. Therefore, the data signal 11 begins with a transition 11a in the positive direction, and has a positive to negative transition 11b which nominally occurs at the center of the second bit time. At the end of the sync duration, a negative to positive transition 11c occurs, nominally at the end of the third bit time. In this example, the first data bit is a binary "1" characterized by a positive to negative transition 11d nominally at the center of the fourth bit time, followed by another binary "1" bit (during bit time five) which begins with a negative to positive transition 11e.

Comparison of the actual biphase data signal 11 with the idealized encoding signal of FIG. 1 shows that there typically is some distortion or degradation in abruptness of the transitions 11a, 11b etc. resulting e.g., from the actual transmission characteristics of the data bus. For error-free data transmission, these transmissions must be sufficiently sharp, and occur at the proper times, so that they can be accurately recognized by the associated receiver circuitry as actual data transitions.

To verify that the biphase characteristics are satisfactory, the error analyzer 10 utilizes a pair of like excursion width detectors 12 (FIG. 4) to measure the actual time width $t_w$ of the respective positive and negative portions of the biphase data signal 11. The error analyzer 10 (FIG. 5) includes a respective positive analyzer 13P and negative analyzer 13N each of which utilizes one of the excursion width detectors 12 of FIG. 4.

Figure 3:
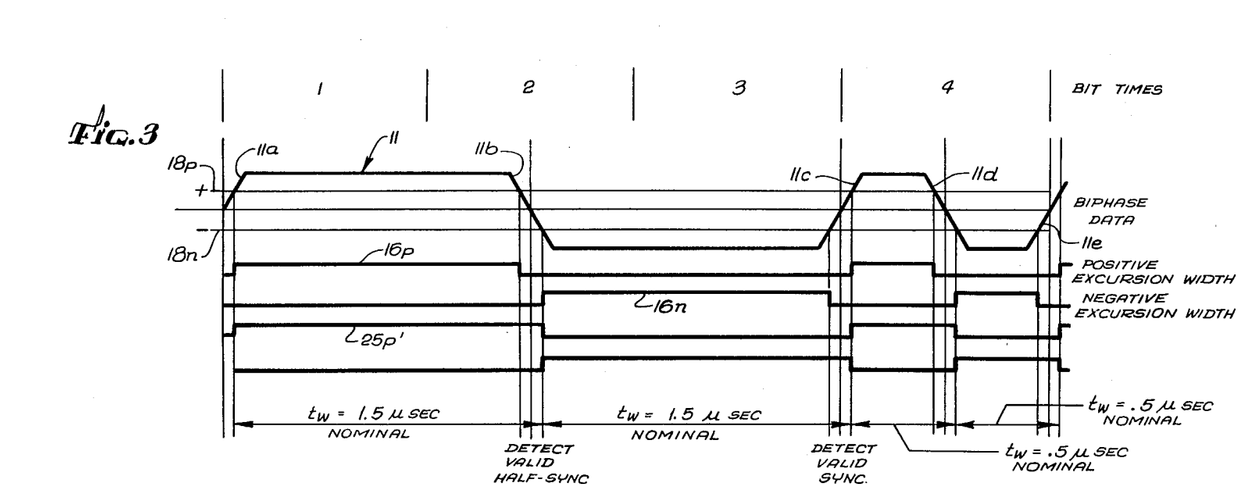
FIG. 3 shows typical waveforms of an actual biphase data signal transmitted on the bus being analyzed, together with the outputs from the threshold detector and the waveshaper to the positive and negative analyzer circuits used to monitor this biphase data signal.

The excursion width detector 12 associated with the positive analyzer 13P operates in conjunction with a threshold detector 14p that receives the positive polarity (+) data from the bus via a terminal 15p and produces a rectangular wave output 16p (FIG. 3) on a line 17p. This signal 16p becomes true as soon as the biphase data signal 11 exceeds a certain positive threshold level 18p (FIG. 3). The signal 16p remains true until the biphase data signal 11 drops below the same threshold level 18p. The negative analyzer 13N (FIG. 5) utilizes an excursion width detector 12 identical to that shown in FIG. 4, but connected to receive the negative data portion of the biphase signal 11 via a negative data terminal 15n. The negative excursion width detector has a threshold detector (like detector 14p of FIG. 4) but configured to provide an output 16n (FIG. 3) which is true when the biphase data signal 11 exceeds (in the negative polarity direction) a negative threshold level 18n.

Associated with the threshold detector 14p is a waveshaper 25p which receives both of the signals 16p and 16n from the respective lines 17p and 17n. The waveshaper 25p produces an output signal 25p' (FIG. 3) on a line 25p" which has a positive going excursion and hence becomes true, at the same time that the signal 16p becomes true. The signal 25p' becomes false (i.e., has a negative going transition) when the signal 16n goes true.

With this arrangement, each true portion of the signal 25p' has a time width $t_w$ which is an accurate representation of the time during which the signal 11 is between consecutive positive and negative going thresholds. This time width $t_w$ thus is an accurate representation of the time between consecutive transitions of the signal 11. It accurately compensates for the fact that the time width of the signal 11 may vary somewhat with different amplitudes of that signal.

For example, if the signal 11 should have a relatively high amplitude, the point at which the positive going and negative going transitions 11a and 11b respectively cross the positive threshold 18p are shown in FIG. 3. However, the signal 11 were to have a lesser maximum amplitude, still above threshold, the rise and fall times of the transitions 11a and 11b, which vary with amplitude, would likely be less steep. Thus the time duration that the signal 16p from the threshold detector 14p is true would be shorter for a signal 11 of lesser amplitude than for a signal 11 of greater amplitude. Accordingly, the time duration of the signal 16p does not give an accurate indication of the true time width between consecutive transitions of the signal 11 on the bus.

A more accurate representation of the true time width of the signal 11 on the bus is given by the signal 25p' at the output of the waveshaper 25p. This signal is true from the time that the signal 11 first crosses a positive going threshold to the time that it next crosses a negative going threshold. Accordingly, the time width tw of the true portion of the signal 25p' is an accurate indication of a true time width of the signal 11 from the bus, with respect to the positive going portion thereof. The waveshaper 25p itself may simply comprise a flip-flop circuit that is set to true by the positive going transition of the signal 16p on the line 17p and which is set to false by the positive going transition signal 16n on the line 17n.

Figure 4:
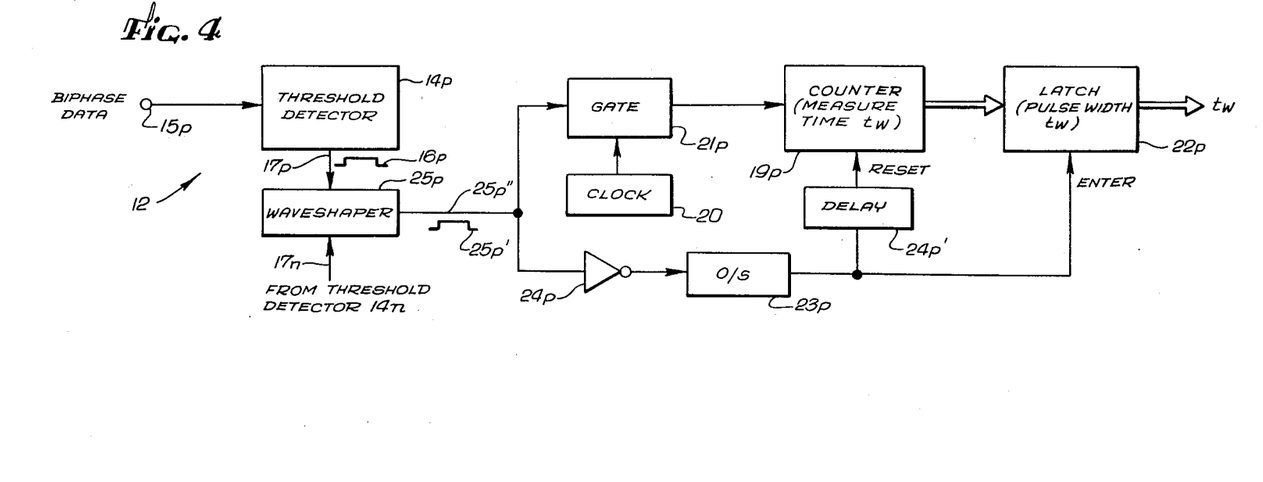
FIG. 4 is an electrical block diagram of an excursion width detector circuit, the output of which is typified by the waveforms of FIG. 3.

This time width $t_w$ is measured digitally by a counter 19p which receives fixed rate pulses from a clock 20 via a gate 21p that is enabled by the true portion of the waveshaper output signal 25p'. Thus the count achieved by the counter 19p digitally represent the time width of the corresponding positive excursion of the biphase data signal 11.

At the end of this positive excursion, when the signal 25p' goes false, the digital time width value is transferred from the counter 19p to a latch 22p and the counter 19p is cleared in readiness for measuring the width of the next positive excursion. The transfer to the latch 22p and resetting of the counter 19p is accomplished by a short duration signal generated by a one-shot 23p triggered by the negative going excursion of the signal 25p' supplied via an inverter 24p. The signal from the one-shot 23p is used to enable data entry into the latch 22p and is delayed slightly in a circuit 24p' before being used to reset the counter 19p. A latch (like the latch 22p of FIG. 4) likewise produces a digital output representing the time width $t_w$ of each negative excursion of the biphase data signal 11.

Figure 6:
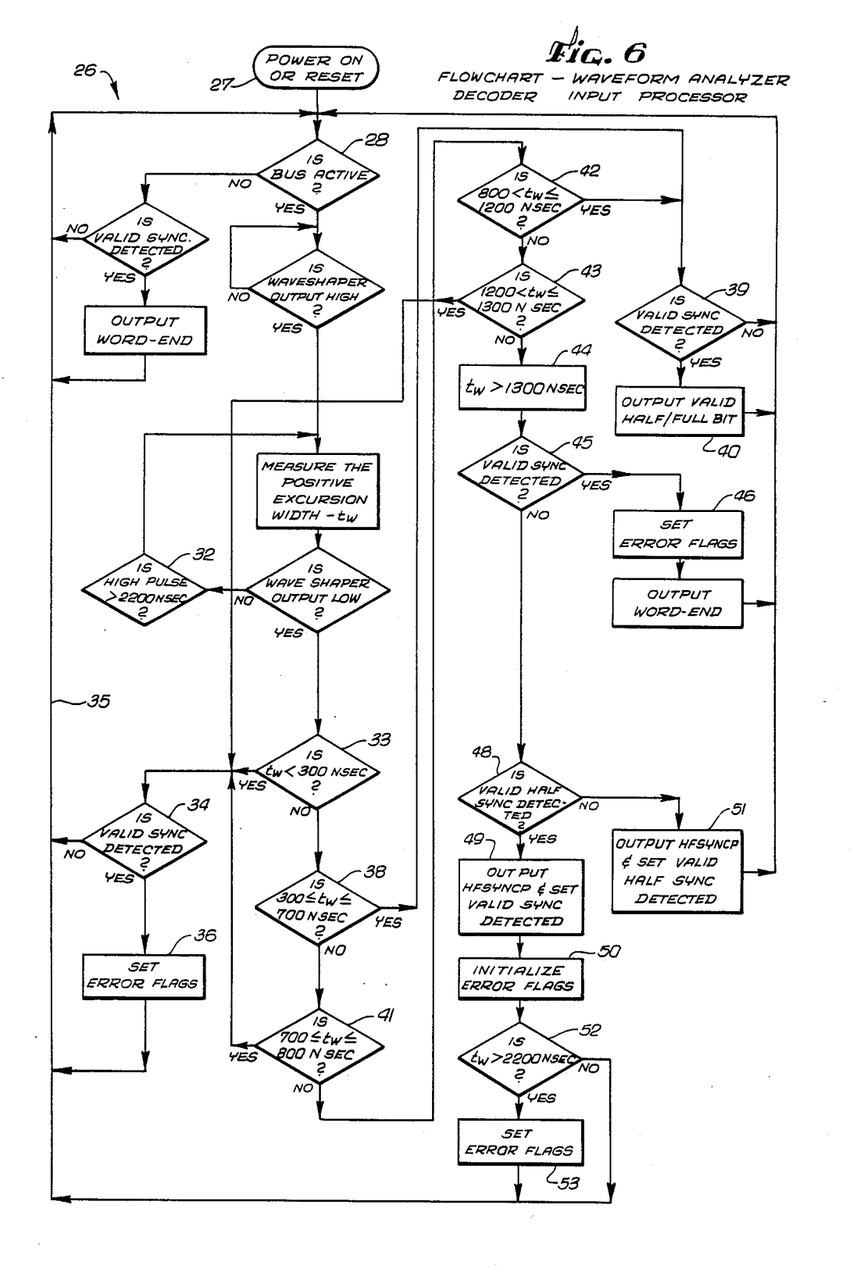
FIG. 6 is a flow chart of the operations carried out in the positive and negative analyzers of FIG. 5.

In each of the positive and negative analyzers 13P, 13N, a data analysis program is carried out in accordance with the flow chart of FIG. 6 to determine whether the measured biphase data signal excursion width falls within certain acceptable ranges associated with valid sync signals or data bits. Referring thereto, the positive analyzer 13P exercises the program 26 continuously, beginning (at block 27) when the power is turned on or reset. A determination is made as to whether the bus is active (block 28), i.e., whether a data signal 11 is present. If so, a determination is made (block 29), implemented in conjunction with the waveshaper 25p the threshold detector 14p, as to whether the data is high (i.e., has gone above the positive threshold 18p). If so, the positive excursion width $t_w$ is measured (block 30), e.g., using the excursion width detector 12 of FIG. 4. The measurement ends (block 31) when the waveshaper 25p output goes low. A check is made (block 32) to confirm that the duration of this positive excursion does not exceed 2.2 microseconds (i.e., that the positive excursion does not exceed two bit times, which would be an error condition).

A set of time width comparisons next is carried out digitally with respect to the measured positive excursion time width $t_w$ provided digitally from the latch 22p. First (block 33) a determination is made as to whether this width is less than 300nsec, which would correspond to less than about one-third of a bit time width, and therefore would represent an error condition. If the positive excursion width is this short, a check is made (block 34) as to whether a valid sync pulse already has been detected (in a manner discussed below). If not, the positive excursion is not part of a valid word being transmitted on the bus (and might e.g., be a transient occurring on the data bus between block data transmissions). In this event, the path 35 is followed and the data analysis program begins again. On the other hand, if a valid sync has been detected, followed by an excursion of very short duration, this excursion represents an erroneous signal or bit error, and appropriate error flags are set (block 36) and the analysis program again is started from block 28.

If the positive excursion width is greater than 300nsec, a determination is made as to whether it is between 300nsec and 700nsec, which is an acceptable width range for a data excursion associated with a valid bit (such as the excursion time $t_w(a)$ indicated in FIG. 1). If this determination (made at block 38) is true, a check is made (at block 39) to determine if a valid sync already has been detected. If so, the data portion of a word is being examined, and an output is produced (block 40) indicating that a valid half-bit is present. The program then returns (via the path 35') to the block 28, so as to monitor for the next positive excursion.

If the measured positive excursion pulse width is greater than 700nsec, a determination is made as to whether it is less than 800nsec in duration (at block 41). If so, this is an erroneous excursion width, and if a valid sync has been detected (block 34) an appropriate error flag is set (block 36).

Next, a determination is made as to whether the excursion width is between 800nsec and 1200nsec (block 42). Such an excursion width is also indicative of a valid data bit, and may occur when a binary "0" is followed by a "1", as shown at tw(b) in FIG. 1. If this acceptable excursion occurs, and a valid sync has been detected (at block 39), the positive analyzer 13P will output a valid full bit indication (at block 40) and the program 26 begins again.

Another check is made (at block 43) to determine if the excursion width is between 1200nsec and 1300nsec which also is an erroneous excursion width. If the test is affirmative, and a valid sync has been detected (at block 34), once again an appropriate error flag is set (at block 36).

The next check is made to determine if the excursion width corresponds to a half sync. Nominally, this width will be one and one-half bit times, or 1500nsec. However, if the final (parity) bit of the preceding data word was a binary "0", the second half of which is positive, and the sync is associated with a command or status word so that the first one and one-half bit times also are positive, the total positive excursion length may be nominally two bit times (2,000nsec) long. Thus a valid half sync condition can occur if the positive excursion width is between 1300nsec and 2200nsec.

Accordingly, if it is determined (block 44) that the width is greater than 1300nsec, a check is made (at block 45) to determine if a valid sync has been detected. If so, another sync should not have been detected until a complete word had occurred. Accordingly, an error flag is set (at block 46) and a signal is output (at block 47) indicating the "word end" condition.

On the other hand, if a valid sync has not yet been detected, a check is made (at block 48) as to whether a valid half sync has been detected. For example, if a data word presently is being transmitted, the negative analyzer 15N already would have detected a valid half sync condition (of negative polarity) and the detection now of a valid half sync condition of positive polarity would mean that a complete valid sync has been detected. In that case, the positive analyzer outputs (at block 49) a valid half sync signal HFSYNCP which is used by the sync detector 55 (FIG. 5) to establish the valid sync detected condition. The error flags are initialized (at block 50).

If a valid half sync has not already been detected (at block 48), a valid half sync detected signal HFSYNCP also is produced (at block 51) which the sync detector 55 utilizes to set the valid half sync condition. The program then 26 is reinitiated.

If the detected excursion width is greater than 2200nsec (as tested at block 52) this is an error condition and appropriate error flags are set (at block 53). If not, the system again reiterates the data analysis program 26.

The negative analyzer 13N uses a data analysis program 26 exactly like that of FIG. 6, but operating with a like excursion width detector 12 associated with the negative excursions of the biphase data signal 11. The analyzers 13P, 13N operate in conjunction with a sync detector 55 (FIGS. 5 and 7) to provide sync type and valid sync detected output signals respectively on the lines 56 and 57.

The positive analyzer produces a valid half sync positive (HFSYNCP) signal (from block 49 or 51) each time that a positive excursion of the biphase data signal 11 having an acceptable half sync duration is detected. An analogous negative half-sync pulse (HFSYNCN) is produced from the negative analyzer 13N.

In the sync detector 55 (FIG. 7) these two valid half-sync signals HFSYNCP and HYSYNCN are used (a) to cause setting of the valid half-sync detected and valid sync detected conditions which are used by the positive and negative analyzers 13P, 13N in carrying out the routine 26 (FIG. 6), and (b) to determine whether the sync is associated with a command or status word, or alternatively is associated with a data word.

Figure 7:
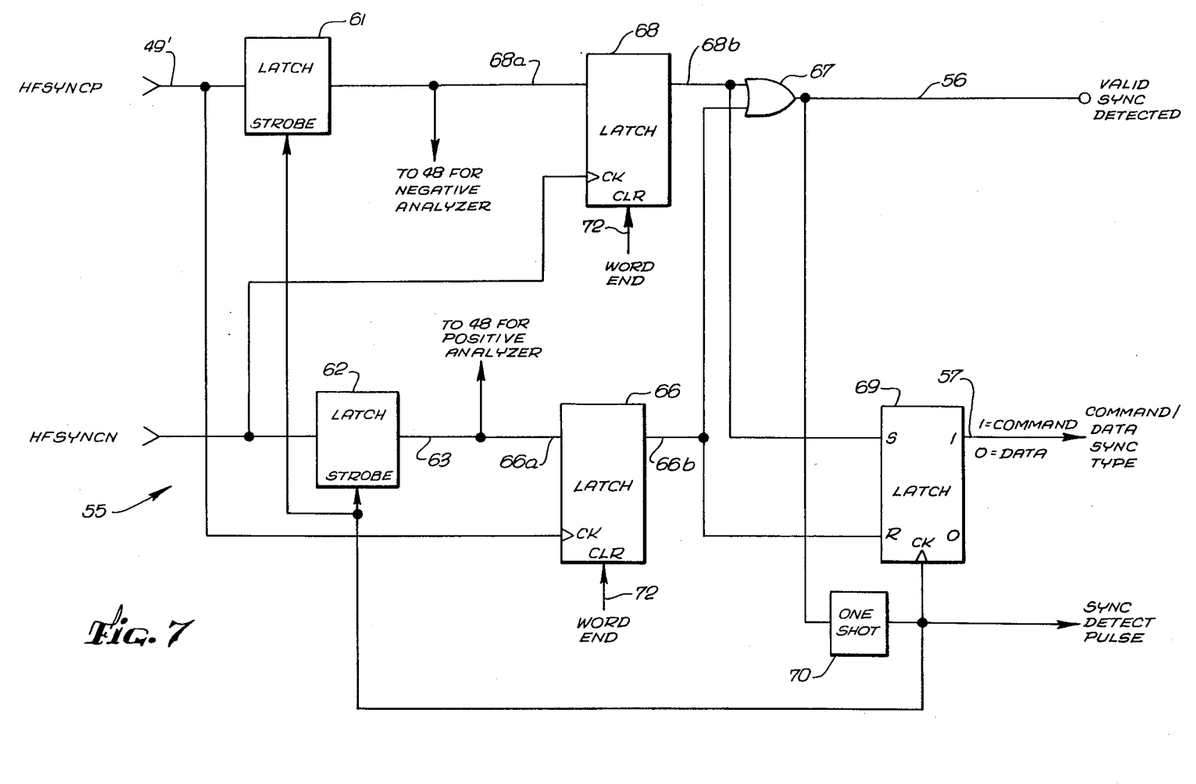
FIG. 7 is a simplified block diagram of the sync detector circuit utilized in the analyzer of FIG. 5.

To carry out the first function, the sync detector 55 includes a pair of latches 61, 62 which respectively are set upon occurrence of the HFSYNCP and HFSYNCN signals. The output 63 from the latch 62 is provided to the positive analyzer 13p as the "valid half-sync detected" signal that is used at the block 48 (FIG. 6). Thus if a data word is present, the first half of the sync signal will be represented by a negative excursion of the signal 11 on the data bus. At the end of this negative excursion, the signal HFSYNCN will become true, as set by the block 51 of the program 26 executed by the negative analyzer 13N. This signal will set the latch 62 to the true condition, providing a true signal on the line 63.

At the end of the second half of the data word sync period, when the block 48 of the program 26 is reached in the positive analyzer 13P, the presence of the prior valid half-sync condition will be indicated as true by the signal on the line 63. The function at the block 49 will be executed and the valid half-sync signal HFSYNCP will be produced on a line 49'. This in turn will set the latch 61 true.

A valid sync detected signal now will be produced on a line 56. This will occur from operation of a latch 66 which is clocked by the leading edge of the signal HFSYNCP on the line 49'. The control input 66a of the flip-flop 66 receives the signal on the line 63. Thus, in the instance of a data word sync, the input line 63 will be true when, at the end of the sync period, the signal HFSYNCP on the line 49' goes true. The leading edge of this signal will cause the true condition on the line 63 to be latched into the flip-flop 66, thereby causing the output line 66b to go true. This true signal is provided via an OR-gate 67 to the line 56 as the valid sync detected signal.

Similarly, if a command or status word sync should be present, latch 61 initially will be set at the end of the first half of the sync period when the signal HYSYNCP goes true. At the end of the second half of the sync period, the signal HFSYNCN will go true, thereby clocking in the high output from the latch 61 to set another latch 68. The resultant high output on the line 68b will be provided via the OR-gate 67 as the valid sync detected signal on the line 56. In either case, this valid sync detected signal on the line 56 is that which is used by the program 26 of FIG. 6 (e.g., at blocks 39 and 45).

The second function of the sync detector 55 is to provide a sync type signal at a line 57. This is accomplished in conjunction with a flip-flop 69 which is clocked at the leading edge of the valid sync detected signal on the line 56 via a one-shot 70. The outputs 66b and 68b from the flip-flops 66 and 68 respectively are provided to the reset (R) and set (S) inputs of the flip-flop 69. With this arrangement, if a data word sync has been detected, at the time that the valid sync detected signal on the line 56 goes true, the flip-flop 66 will be reset, thereby providing a high signal on the line 66b to the (R) input of the flip-flop 69. As a result, a low (0) signal will be present in the line 57 indicating that a data sync type (i.e., a sync signal from a data word) is present. Conversely, if a command or status word sync is present, the line 68b will be true when the valid sync detected signal on the line 56 goes true. In this case, the set (S) input to the flip-flop 69 will be true at the time the circuit is clocked, thereby providing a high ("1") signal on the line 57 which indicates that a command or status type sync has been detected. The output of the one-shot 70 also is used to clear both of the latches 61 and 62 after detection of a valid sync pulse. The latches 66 and 68 themselves are cleared by occurrence of a "word end" signal on line 72 from a word end detector 73.

Figure 8:
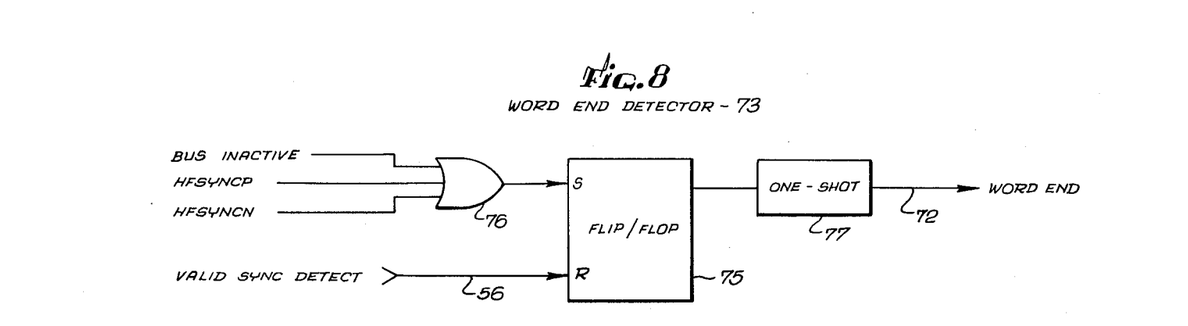
FIG. 8 is a simplified block diagram of the word end detector utilized in the analyzer of FIG. 5.

An illustrative embodiment of the word end detector 73 is shown in FIG. 8. This circuit provides a "word end" signal on the line 72 when one of two conditions occur: (1) new valid half-sync signal is detected, indicative of the beginning of the next word transmitted on the data bus, or (2) the data bus goes inactive.

To accomplish this, a flip-flop 75 is reset by occurrence of the valid sync detected signal from the line 56. That signal is indicative of the beginning of a command, status or data word. Thereafter, upon the next detection by the positive or negative analyzer 13P or 13N of a valid half-sync condition, the flip-flop 75 is set to provide a true output. Occurrence of either the HFSYNCP or HFSYNCN signals is indicative of this new half-sync detected condition, and these signals are supplied via an OR-gate 76 to the set (S) input of the flip-flop 75. When that circuit is set, the high output is fed through a one-shot 77 to produce a word end pulse on the line 72.

The word end signal also is produced if the bus should go inactive after detection of a valid sync signal. The inactive bus condition is detected by the two threshold detectors 14p, 14n which respectively monitor positive and negative excursions of the data signal on the bus. If neither threshold detector 14p, 14n should provide an output, this is indicative that the bus has gone "dead". In this case, a true signal on a "bus inactive" line is provided via the OR-gate 76 to set the flip-flop 75 and thereby produce the word end signal.

The inventive error analyzer 10 (FIG. 5) also may be provided with an error detector circuit 80 (FIG. 9) which outputs signals indicative of certain error conditions. Two such conditions occur if words having too many or too few bits should be detected. As is evident from FIG. 2, the normal, error-free word will include a sync signal followed by seventeen data/parity bits. If this is followed immediately by another word, the next valid sync signal will be detected after exactly seventeen data/parity bits have been detected. The presence of too many or too few bits is indicative of a corresponding word error.

Figure 9:
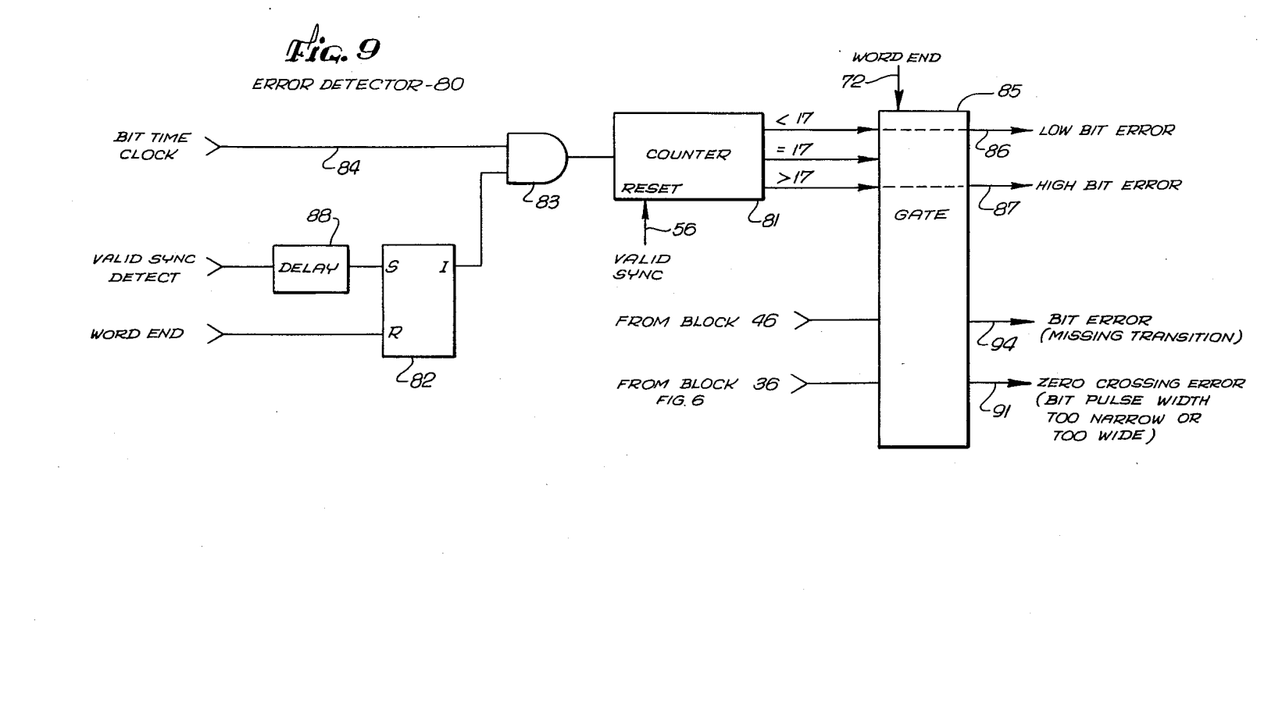
FIG. 9 is a simplified block diagram of the error detector utilized in the analyzer of FIG. 5.

To detect this type of error, the circuit 80 includes a counter 81 which is reset to zero upon occurrence of a valid sync detected signal on the line 56. The same valid sync detected signal also sets a flip-flop 82 to provide an enable signal to an AND-gate 83 which gates through bit time clock pulses to the counter 81. These clock pulses, provided on a line 84 occur at the nominal bit rate, typically one microsecond per bit. Thus the counter 81 begins to count at rate corresponding to the bit timing, but beginning just after a valid sync signal has been detected.

The counter output is monitored when a word end is detected, as indicated by a "word end" signal on the line 72. This signal enables a gate 85 to provide as outputs signals which are indicative of the contents of the counter 81 when the word end condition occurs. If the counter then contains a count of "17", there is no bit error since the correct number of bits have occurred. On the other hand, if the word end signal occurs before a time corresponding to seventeen bit times, the counter 81 contents will be less than seventeen. This signal will be supplied via the gate 85 as a "low bit error" signal. Conversely, if more than seventeen bit times have gone past, the contents of the counter 81 will be greater than seventeen and this signal will be provided as an output indicating a "high bit error". These low and high bit error signals will occur on the lines 86 and 87 respectively. To avoid a race condition, the setting of the flip-flop 82 by the valid sync detected signal may be delayed slightly in a delay circuit 88.

Another class of error which may be detected by the inventive analyzer is sometimes referred to as a "zero crossing error". Referring to FIG. 1, each valid bit signal is characterized by having a transition (from 0 to 1 or from 1 to 0) at the mid-bit time. If, however, this transition occurs too soon or too late, this is classed as one type of "zero crossing error". Further, certain transitions occur between one bit and the next. For example, in FIG. 1 where a "1" data bit is followed by another "1" data bit, a transition will occur exactly between the two bit times. This transition also may occur too soon or too late. Such erroneous occurrence time of this transition likewise is classed as a "zero crossing error".

This zero crossing error condition is effectively detected by the positive and negative analyzers 13P and 13N in connection with the positive and negative excursion time width measurement operations performed therein. For example, if a "1" data bit is being transmitted, as shown at 90 in FIG. 1, the initial half-bit signal is represented by a positive excursion which should have a width of 500nsec. However, if the mid-bit transition occurs too soon, this positive excursion time may be e.g., less than 300nsec. That situation will be detected during execution of the program 26 (FIG. 6) at block 33. The error flag set at block 36 will be a signal indicative of this class of zero crossing error. At the end of the word, the flags set at block 36 may be supplied as error-indicating outputs via the gate 85. For example, in FIG. 9 such an output is shown on a line 91 as a "zero crossing error" signal.

Another class of error may occur when a transition is missing entirely. For example, if the mid-bit transition 93 in FIG. 1 were missing entirely, the data excursion on the bus would remain negative for about 1500nsec, between the transitions 93a and 93b. This condition would be detected by the negative analyzer 13N at blocks 44, 45 and 46 of FIG. 6. At the block 46, an error signal would be set indicating that a negative excursion is greater than 1300nsec. An output signal derived from the error flag set at block 46 then may be provided via the gate 85 as a "bit error" signal, indicative of a missing bit transition, on a line 94.

I claim:

1. In a system for detecting errors in data handled on a bus in a biphase format in accordance with a certain bus protocol, the improvement comprising:
    first means for establishing (a) a first signal which goes true when said data exceeds a certain positive threshold and goes false when said data thereafter exceeds a certain negative threshold, and (b) a second signal which goes true when said data exceeds said certain negative threshold and goes false when said data thereafter exceeds said certain positive threshold, and
    positive and negative analyzer means, cooperating with said first means, for detecting errors digitally respectively in response to the separately measured time duratons of said first and second signals.

2. In a system according to claim 1 wherein data words in conformance with said bus protocol include an initial sync signal characterized by a data excursion of one polarity followed by an excursion of the opposite polarity, the time duration of each such excursion in said sync signal being of certain time duration greater than that of each data bit following said sync signal in said data word, and wherein each of said analyzer means comprises:
    half sync detection means for ascertaining that the time duration of said respective first or second signal is within an acceptable time range corresponding to said certain time duration, and for providing a valid half sync signal in response thereto, and wherein said system further comprises:
    valid sync detection means, cooperating with said positive and negative analyzer means, for ascertaining the consecutive occurrence of said valid half sync signal first from one and then the other of said analyzer means, and for providing a valid sync detected signal in response thereto.

3. In a system according to claim 2 wherein said half sync detection means and said valid sync detection means operate continuously throughout data reception, irrespective of whether data bits currently are being received.

4. In a system according to claim 2 wherein each word includes a plurality of data bits following said initial sync signal, each such data bit being characterized by a first data excursion of one polarity followed by a data excursion of the opposite polarity, each of said excursions having a certain acceptable time duration different from the acceptable time duration for an excursion of said sync signal, and wherein each of said analyzer means further comprises:

half bit detection means for determining digitally in response to the measured time durations of said respective first or second signals, the occurrence of a data excursion having a time duration outside said acceptable range for a data bit, and for providing bit error signals in response thereto.

5. In a system according to claim 2 wherein each data word in conformance with said bus protocol includes a certain number of data bits, each of certain nominal time duration, following said initial sync signal, said system further comprising:

high/low bit error detector means, cooperating with said positive and negative analyzer means, for initiating a bit time counting operation upon occurrence of a valid sync detected signal, and for terminating said bit time counting operation in response to the detection of a word end condition, said counting operation being carried out by a counter incremented by clock pulses corresponding to said nominal time duration, the contents of said counter upon termination of counting being either equal to, less than or greater than said certain number of data bits included in each data word, with contents less than or greater than said certain number being indicative respectively of a low bit error or a high bit error.

6. A system according to claim 2 wherein each analyzer means detects a bus inactive condition and generates a signal indicative thereof, said system further comprising a word end detector, said word end detector comprising:

means for detecting first said valid sync detected signal and thereafter the occurrence of either a valid half sync signal or a signal indicative of a bus inactive condition, a word end signal being generated upon such subsequent detection.

7. In a system for detecting errors in data handled on a bus, in biphase format, in accordance with a certain bus protocol, the improvement comprising:

first and second threshold detector means for respectively detecting when said biphase data has exceeded certain respective positive and negative threshold levels, waveshaper means, cooperating with said threshold detectors, for providing respectively a first signal which becomes true when said biphase data exceeds one polarity threshold and thereafter goes false when said data exceeds the opposite polarity threshold and a second signal which becomes true when said biphase data exceeds said opposite polarity threshold and thereafter goes false when said data exceeds said one polarity threshold, excursion timing means for digitally measuring the time duration that each of said first and second signals are true, said times being indicative of the respective timings of the positive and negative excursions of said biphase data signal, and first and second analyzer means, responsive respectively to the measured times that said first and second signals are true, for determining the consecutive occurrence of a pair of opposite polarity excursions each having a certain first timimg indicative of a synchronization signal of said biphase data.

8. The improvement of claim 7 wherein said first and second analyzer means continues to be responsive to said measured times, and thereby continue to determine the occurrence of another synchronization signal of said biphase date, even after detection of a first synchronization signal and during the expected transmission on said bus of data bits.

9. In a system for detecting errors in data handled in biphase format on a bus in accordance with a certain bus protocol, the improvement comprising:

positive and negative analyzer means, respectively responsive to the separately measured time durations of positive and negative excursions of said data, for determining the occurrence of a sync signal in said data characterized by the consecutive occurrence of excursions of opposite polarity each of a first certain time duration, said analyzer means also detecting a bus inactive condition and providing a signal indicative thereof, bit time counting means for counting the total number of bits present in said data, or alternatively for counting bit timing clock pulses corresponding to the expected occurrence rate of data bits on said bus, and means for ascertaining the accumulated count upon next subsequent detection by said positive and negative analyzer means of a sync signal or of a signal indicative of a bus inactive condition, and for determining the numerical relationship between said count and the expected number of data bits transmitted in each word in accordance with said certain bus protocol, such numerical relationship indicating a corresponding number of bits error.

10. In a system for detecting errors in data handled in biphase format on a bus in accordance with a certain bus protocol, the improvement comprising:

positive and negative analyzer means for measuring the respective time durations of positive and negative excursions of said biphase data on said bus, and for determining in response thereto the occurrence of consecutive data excursions of opposite polarity for time durations indicative of a synchronization signal, and for thereafter determining the occurrence of positive or negative excursions of said date the time durations of which do not correspond to an acceptable bit excursion duration, such condition being indicative of a transition error in said data, said analyzer means also detecting a bus inactive condition and providing a signal indicative thereof, and means for providing a corresponding error indication upon detection by said analyzer means of the next subsequent sync signal or of a signal indicative of a bus inactive condition.

* * * * *